Patented Feb. 10, 1931

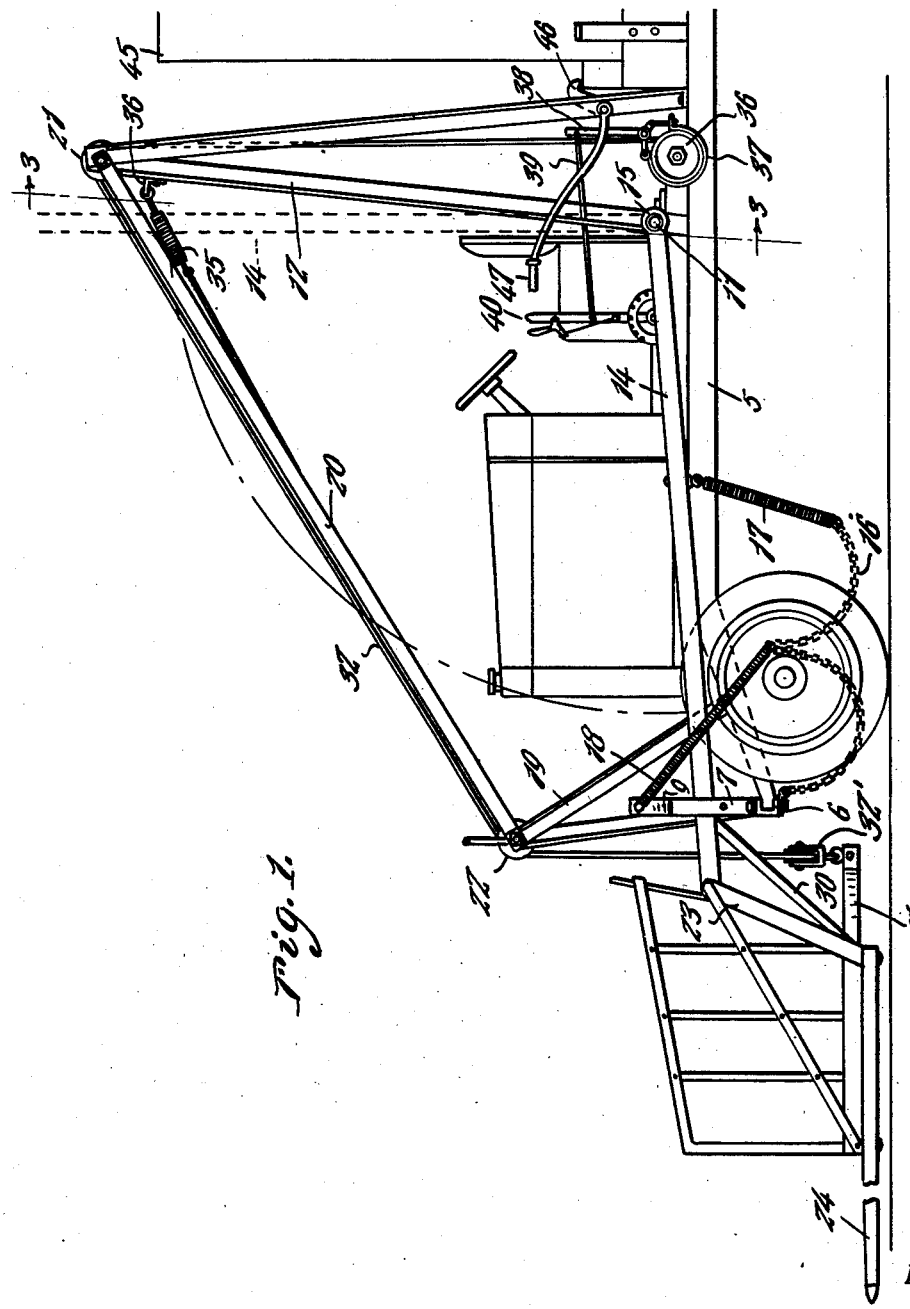

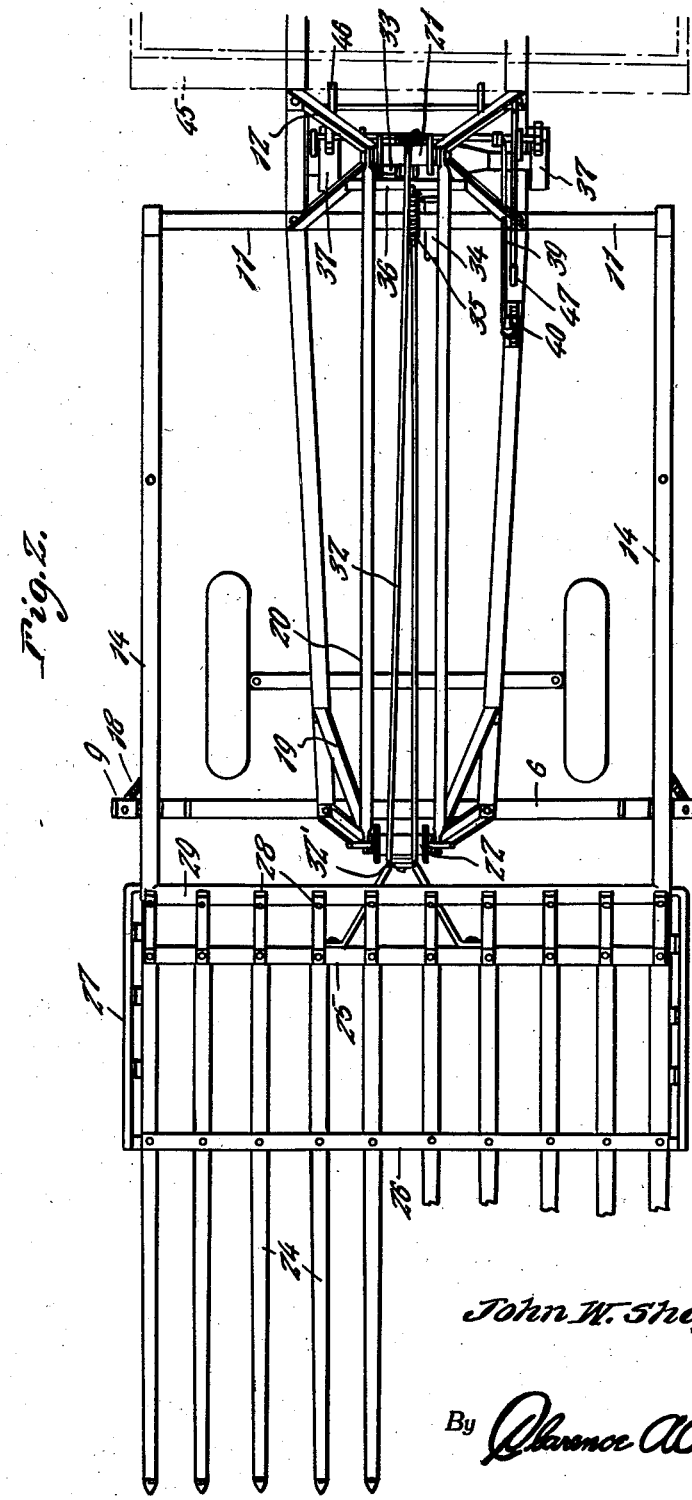

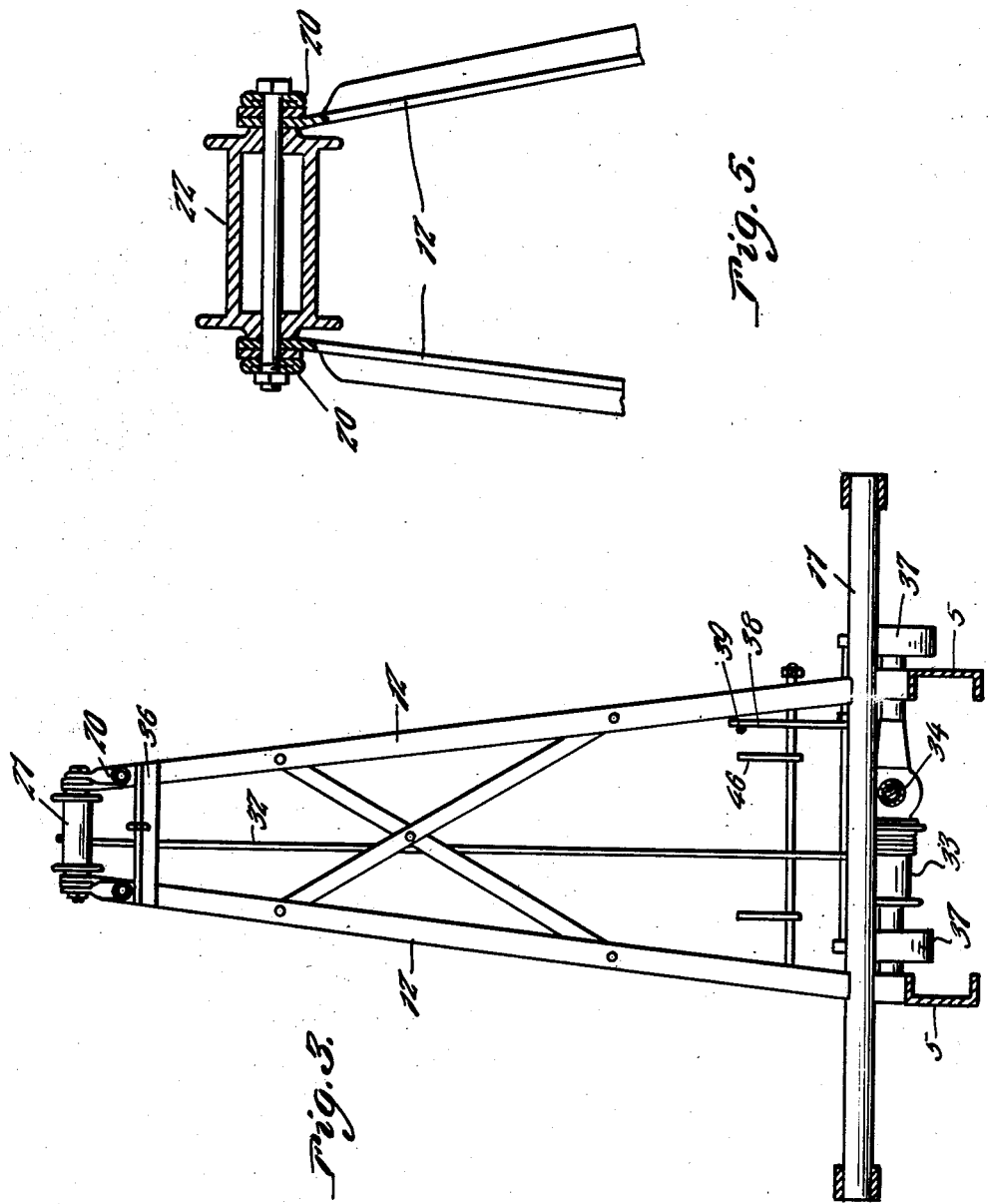

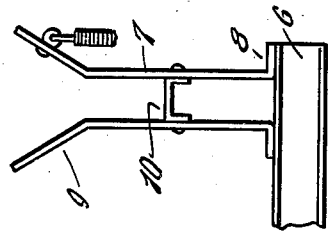
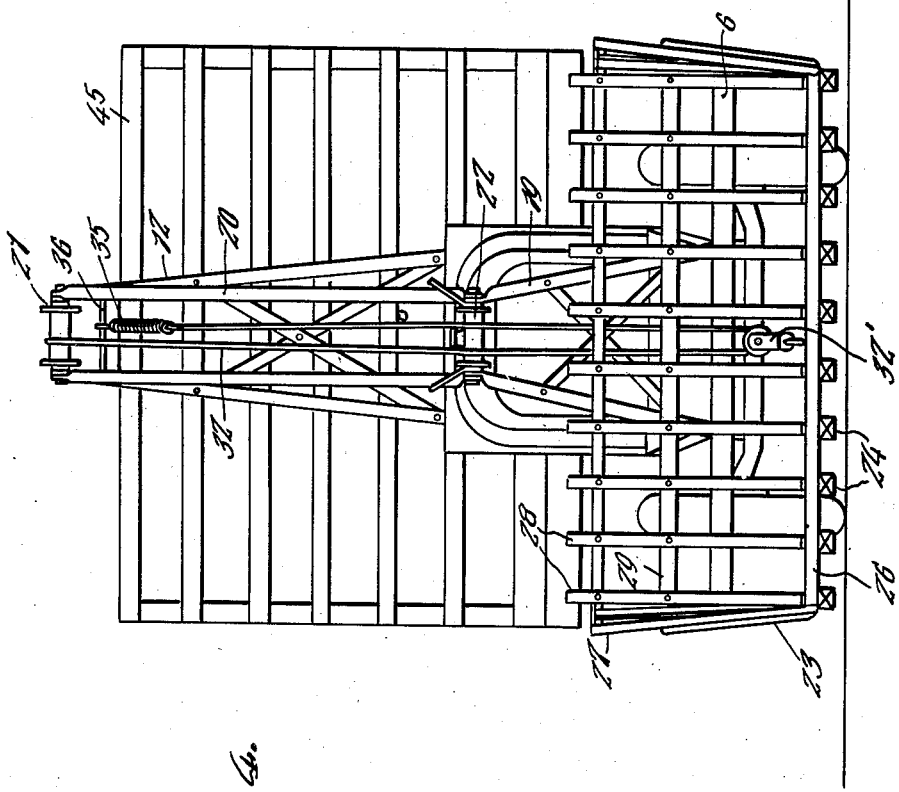

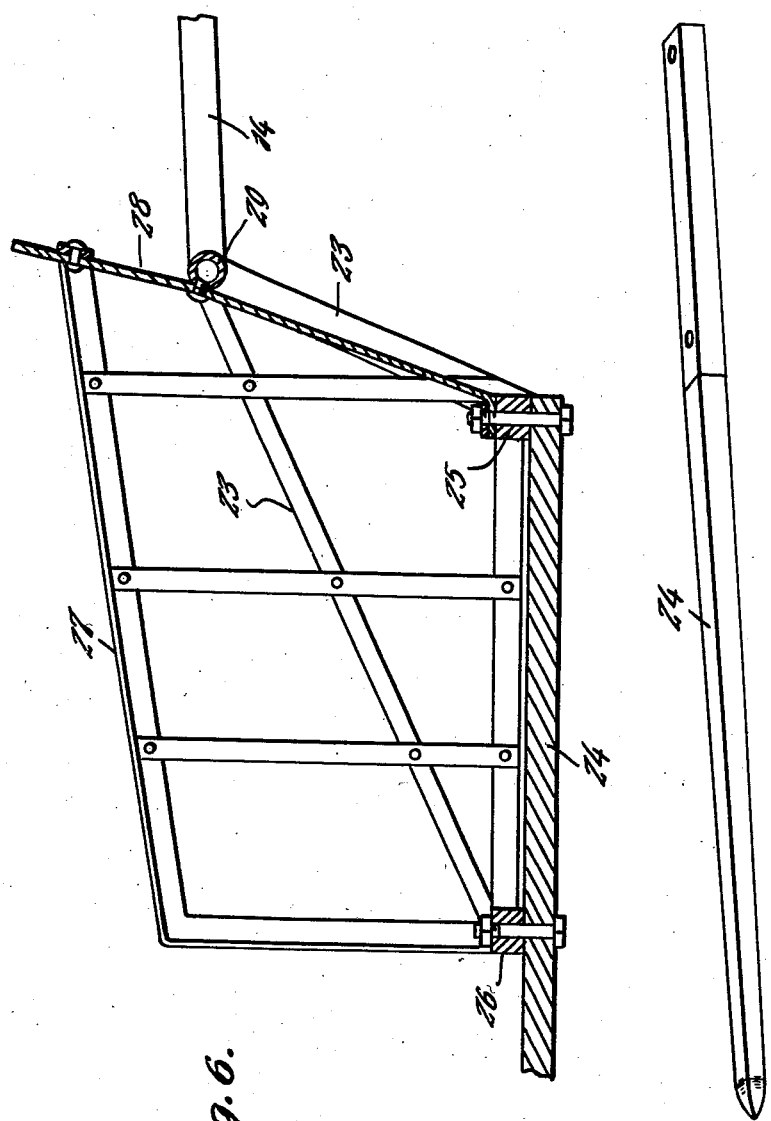

1,791,979

UNITED STATES PATENT OFFICE

JOHN W. SHARP, OF BOZEMAN, MONTANA

LOADER ATTACHMENT FOR TRUCKS

Application filed August 24, 1929. Serial No. 388,218.

The present invention relates to a loader and has for its prime object to provide a mechanism of this nature in the form of an attachment for trucks.

Another very important object of the invention resides in the provision of a loader attachment of this nature for trucks whereby bundles of wheat, grain or other commodity or the like may be picked up and loaded on to the truck in an expeditious manner.

Another very important object of the invention resides in the provision of a loader attachment of this nature which is simple in its construction, strong and durable, compact and convenient in its arrangement of parts, easy to manipulate, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the attachment embodying the features of my invention, Figure 2 is a top plan view thereof, Figure 3 is a vertical transverse section taken substantially on the line 3—3 of Figure 1, Figure 4 is a front elevation of the attachment, Figure 5 is a detail section through the pulley, Figure 6 is a fragmentary longitudinal section through the basket, Figure 7 is a perspective view of one of the tines, Figure 8 is a detail view of one of the stands.

Referring to the drawings in detail it will be seen that the numeral 5 denotes the chassis of an automobile truck to the front cross portion of which is secured a channel bar 6 from the ends of which rise guide stands one of which is shown to advantage in Figure 8 comprising spaced parallel standards 7 having feet 8 fixed to the bar 6 and merging at their upper ends to upwardly and outwardly diverging guide extensions 9.

A rest 10 is secured to the standards 7 intermediate their ends. A stationary shaft 11 is mounted across the frame 5 and a mast structure 12 rises from the frame 5 adjacent thereto. A pair of arms 14 have collars 15 at their rear ends rockable on the extremities of the shaft 11 and their forward portions normally are disposed between the standards 7 of the stands resting on the rest 10.

Chains 16 are anchored to the ends of the bar 6 and attached to springs 17 which are engaged with intermediate portions of the arms 14. Springs 18 are engaged with intermediate portions of the chain 16 and with the outer ones of the guide extensions 9 to prevent the chains from dragging on the ground.

A front mast structure 19 rises from the frame 6 and braces 20 connect the upper ends of the mast structures 12 and 19 and since the mast structure 19 is shorter than the mast structure 12, these braces 20 incline downwardly and forwardly.

An elongated pulley 21 is journaled in the upper end of the mast structure 12 while an elongated pulley 22 is journaled in the upper end of the mast structure 19.

The arms 14 are provided with angular extensions 23 between which a basket or rake is mounted. This rake comprises a plurality of spaced parallel coextensive tines 24 connected by cross bars 25 adjacent their rear ends and a cross bar 26 adjacent their intermediate portions.

Sides 27 rise from the rear portions of the side tines 24. Back strips 28 extend upwardly from the cross bar 25 and are connected together at their upper ends by a cross bar 29. This back structure is disposed at an acute angle in respect to the plane of the tines 24.

Braces 30 are connected with the rake and the arms 14. A bracket 31 extends from the rake and has a pulley 32' engaged thereon. A cable 32 is windable on a drum 33 and trained over the pulley 21, then the pulley 22, then the pulley 32', and then back over the pulley 22 and is engaged with a spring 35 anchored on a cross member 36 in the upper portion of the mast structure 12.

The drum 33 is operatively connected with the engine of the truck by suitable mechanism 34 for operation thereby and brake drums 36 are connected therewith and have bands 37 circumjacent themselves and actuatable by a lever 38, a link 39 and a lever 40 disposed adjacent the driver's seat.

With the parts disposed as shown in full line in Figure 1 it will be seen that the truck may be moved forwardly to force the tines 24 under a bundle or anything else that is desired to be picked up thereby forcing the bundle or the like into the rake. The operator may then cause the rotation of the drum 33 to wind the cable thereon which will obviously cause the swinging of the arms 14 upwardly and rearwardly causing the chains 16 to become taut placing tension on the springs 17 until the arms 14 are in dotted line position indicated in Figure 1 which will cause the contents of the rake to be dumped in the body 45 on the truck which is preferably of the dump type releasable by catch 46 controllable by lever 47.

The rake may be held as long as desired in this elevated position by tightening the band 37 on the drums 36 but as soon as these bands are released it will be seen that the spring 17 will urge the rake forwardly and allow it to gravitationally swing downwardly.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the inventiton and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. An attachment of the class described comprising a shaft, arms rockable on the shaft, a mast structure rising from adjacent the shaft, a drum, a pulley journaled in the upper end of the mast structure, a second mast structure disposed forwardly of the first mast structure, a pulley journaled in the upper end of the second mast structure, a receptacle on the forward end of the arms, a cable windable over the drum, trained over the pulleys and over a pulley engaged with the receptacle and then back over the pulley in the second mast and then anchored on the first mast, a pair of stands for receiving said arms when in a lowered position, each stand comprising a pair of spaced parallel standards merging at their upper ends into outwardly directed guide extensions, and a rest across the standards for the arms, a cross bar on which said stands are mounted.

2. An attachment of the class described comprising a shaft, arms rockable on the shaft, a mast structure rising from adjacent the shaft, a drum, a pulley journaled in the upper end of the mast structure, a second mast structure disposed forwardly of the first mast structure, a pulley journaled in the upper end of the second mast structure, a receptacle on the forward end of the arms, a cable windable over the drum, trained over the pulleys and over a pulley engaged with the receptacle and then back over the pulley in the second mast and then anchored on the first mast, a pair of stands for receiving said arms when in a lowered position, each stand comprising a pair of spaced parallel standards merging at their upper ends into outwardly directed guide extensions, and a rest across the standards for the arms, a cross bar on which said stands are mounted, chains engaged with said cross bar, springs engaged with said chains and with intermediate portions of the arms, springs engaged with the stands and with intermediate portions of the chains to prevent dragging thereof.

In testimony whereof I affix my signature.

JOHN W. SHARP.